United States Patent [19]
Stoltman

[11] 3,809,019
[45] May 7, 1974

[54] ROTARY ENGINE WITH LOW EMISSION MANIFOLDING

[75] Inventor: Donald D. Stoltman, Henrietta, N.Y.

[73] Assignee: General Motors Corporation, Detroit, Mich.

[22] Filed: Feb. 9, 1973

[21] Appl. No.: 331,052

[52] U.S. Cl............ 123/8.01, 60/901, 123/122 AB, 123/122 AC, 123/122 D, 123/122 H
[51] Int. Cl....................... F02b 53/00, F02m 31/04
[58] Field of Search ........... 123/8.01, 8.45, 122 AB, 123/122 D, 122 B, 122 H, 122 AC; 60/901

[56] References Cited
UNITED STATES PATENTS

| 1,940,628 | 12/1933 | Litle | 123/122 H |
|---|---|---|---|
| 2,862,490 | 12/1958 | Trisler | 123/122 H |
| 3,244,153 | 4/1966 | Froede | 123/8.45 |
| 3,398,524 | 8/1968 | Leising et al. | 123/8.45 X |

FOREIGN PATENTS OR APPLICATIONS

| 1,020,274 | 2/1966 | Great Britain | 123/8.45 |

Primary Examiner—Carlton R. Croyle
Assistant Examiner—Michael Koczo, Jr.
Attorney, Agent, or Firm—Robert J. Outland

[57] ABSTRACT

In a preferred embodiment, a dual rotor internal combustion engine is provided with manifolding including a two-stage intake manifold mounted on an exhaust manifold having an integral insulated reactor chamber and an exhaust heat passage external to the reactor chamber with a damper valve to control exhaust flow through the heat passage. The exhaust heat passage is in heat exchange relation with the primary mixture passage of the inlet manifold through a heat-transmitting plate. The plate forms part of a sheet metal bonnet which encloses portions of the exhaust manifold heat passage to form a heat stove connectible to provide heated air to the engine air inlet. Additional features are also disclosed.

4 Claims, 3 Drawing Figures

PATENTED MAY 7 1974

3,809,019

3,809,019

ROTARY ENGINE WITH LOW EMISSION MANIFOLDING

BACKGROUND OF THE INVENTION

This invention relates to rotary internal combustion engines and, more particulrly, to exhaust and inlet manifold arrangements for such engines, including means for reducing emissions of combustibles by aiding vaporization of the air-fuel mixture, as well as through post-combustion reaction of exhaust gases.

The development of rotary piston engines for automotive vehicles and the anticipated increase in the appliction of such engines forecasts the need for improved arrangements of manifolds and other engine components to meet present and future standards for control of exhaust emissions. While exhaust reactors and heated inlet manifolds have been proposed for use with rotary engines, it is desirable that such arrangements be compact in nature while preferably providing for heating of the intake charge by the engine exhaust gases during warmup. The provision of exhaust heat for the engine inlet air, as well as for control of the carburetor choke opening, as is known in piston-type engines, should desirably also be provided in rotary engine manifold arrangements.

SUMMARY OF THE INVENTION

The present invention provides a manifold assembly in combination with a rotary piston-type internal combustion engine having the desired advantages in the form of a compact, easily assembled and installed unit. The arrangement provides a manifold reactor secured to the engine housing and providing an insulated reaction chamber with an integral exhaust heat passage external to the reaction chamber with exhaust gas flow therethrough being controlled by a damper valve. An inlet manifold, preferably of the two-stage type, is mounted on the exhaust manifold with the primary mixture passage in heat exchange relation with the exhaust heat passage to promote fuel vaporization during engine warmup. A sheet metal heat stove encloses the heat passage portion of the exhaust manifold to provide heated air to the engine induction system. The heat stove member is mounted between the exhaust and inlet manifolds and acts as a separator and hot spot between the exhaust heat passage of the exhaust manifold and the primary mixture passage of the inlet manifold. A heat tube extends through the exhaust heat passage to the choke on the intake manifold mounted carburetor to provide the desired choke opening control.

These and other features of the invention will be more fully understood from the following description of a preferred embodiment of the invention, taken together with the accompanying drawing.

DESCRIPTION OF THE PREFERRED EMBODIMENT

Figures 1, 2, 3:
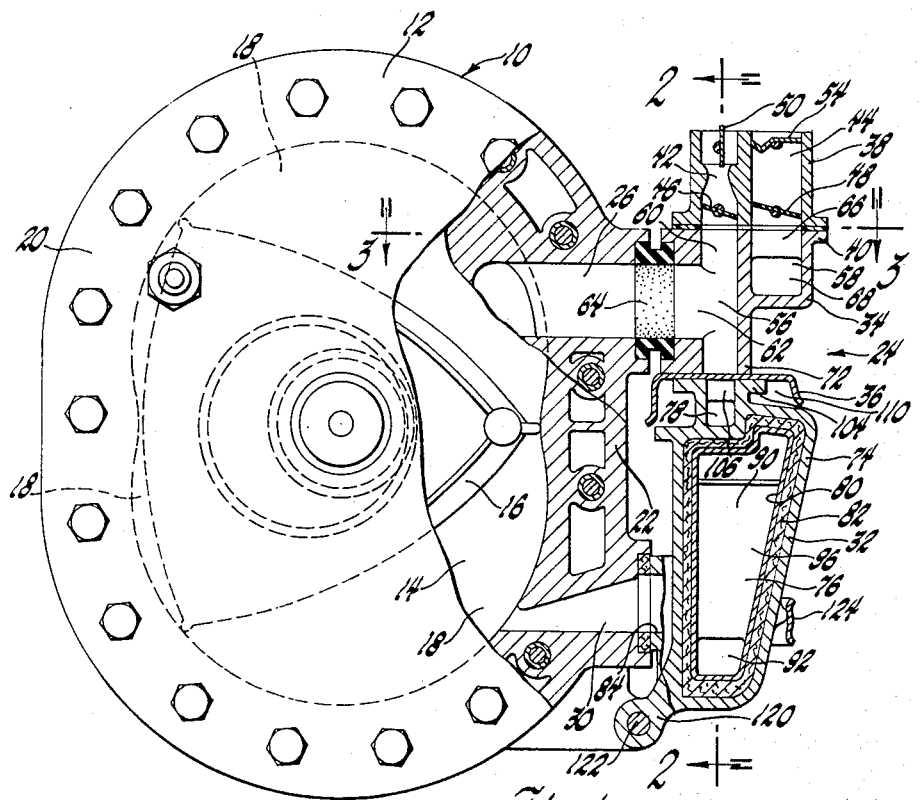
FIG. 1 is a front view of a rotary internal combustion engine having portions in section disclosing the construction of an intake and exhaust manifold assembly and exhaust porting formed in accordance with the invention.
FIG. 2 is a cross-sectional view of the engine and manifold assembly of FIG. 1 taken generally in the plane indicated by the line 2—2 of the figure.
FIG. 3 is a top view of the manifold assembly portion of FIG. 1 shown with the carburetor removed as viewed from the plane indicated by the Line 3—3 of FIG. 1.

In the drawing, numeral 10 generally indicates a rotary internal combustion engine of known construction having a housing 12 defining a pair of two-lobed epitrochoidal cavities 14 (only one being shown) and a pair of triangular rotors or piston 16 arranged for concentric rotation one within each of the cavities 14. The pistons 16 define, within their respective cavities, a pluralit of expansible chambers 18 which, upon eccentric rotation of the pistons, are passed through a conventional internal combustion engine cycle having intake, compression, power and exhaust events, the chambers moving around the periphery of their respective cavities with the movement of their respective rotor-piston once each cycle.

As shown in the drawings, the engine housing 12 is arranged with the cavities 14 disposed in horizontal end-to-end relation, the housing including a pair of oppositely disposed, generally vertically extending side walls 20, 22, on the latter of which there is mounted an exhaust-intake manifold assembly generally indicated by numeral 24. The housing end wall is provided near its upper end with a primary intake port 26 extending from the manifold mounting surface thereof inwardly to connect with both of the rotor cavities 14 at their adjacent inner ends. In addition, secondary intake ports 28 extend through the wall 22 and connect with the rotor cavities 14 at their outer ends. A pair of exhaust ports 30 also extend through wall 22 at the lower end thereof from the outer manifold mounting surface inwardly to connect one with each of the cavities 14.

The intake-exhaust manifold assembly 24 includes a reactor manifold 32, a two-stage intake manifold 34 and a sheet metal heat stove bonnet and hot spot 36 secured between the intake and exhaust manifolds. A carburetor 38 is mounted on a boss 40 provided therefor on the upper portion of the intake manifold 34.

Carburetor 38 includes primary and secondary bores 42 and 44, respectively, each arranged to provide a mixture of air and fuel to corresponding manifold passages to which they are connected. Both carburetor bores include throttle valves 46, 48, controlled by appropriate linkage, not shown. The primary bore contains, in addition, a choke valve 50 controlled by an externally mounted thermostatic mechanism 52 of conventional construction. The secondary bore is preferably provided with an air valve 54 which controls airfuel mixture in the manner described in U.S. Pat. No. 3,628,773 Kehoe and Stoltman.

The intake manifold 34 is preferably formed as an integrally cast member having separate primary and secondary mixture flow passages 56 and 58, respectively. The primary passage 56 includes a vertically extending riser portion 60 connecting with a horizontally extending runner 62 which connects with the engine inlet port 26, the joint being sealed by a rubber bushing 64. The secondary passage 58 includes a vertical riser portion 66 extending from the secondary bore 44 of the carburetor to a pair of curved horizontally extending runners 68. The runners 68 connect with the secondary inlet ports 28 of the engine housing, the joints being sealed by rubber bushings 70. The primary riser 60 extends downwardly of the runner 62, opening through a lower boss 72 provided on the inlet manifold for a purpose to be subsequently described.

The exhaust reactor manifold 32 includes an integral cast body 74 defining an enlarged, generally rectangular reaction chamber 76 and an exhaust heat passage 78 extending outwardly of the chamber 76 along the upper edge and one side thereof.

The walls of the reaction chamber 76 are provided with sheet metal linings 80 which are separated from the cast outer walls by insulation 82 in the form of any suitable insulating material or a dead air space. This portion of the construction may be made, for example, by casting the outer housing walls around the sheet metal liner in the manner described in U.S. Pat. application Ser. No. 140,035 Cole, filed May 4, 1971, now U.S. Pat. No. 3,724,218, in which the insulating material is sand, or in the manner described in U.S. Pat. application Ser. No. 209,149 Haddad, filed Dec. 17, 1971, now U.S. Pat. No. 3,729,937, in which the insulating material is air.

A pair of inlet ports 84 are provided through a wall of the exhaust manifold connecting the reaction chamber 76 with the exhaust ports 30 of the engine. The interior of the reaction chamber is provided with sheet metal baffles 86, 88 and 90, which define a main flow passage 92 along the bottom and one side of the reaction chamber and individual extended flow paths 94, 96 from the two inlet ports 84 to the main flow passage 92, thus providing for extended residence time of exhaust gases within the reaction chamber.

Separate outlet openings 98 and 100 are provided at opposite ends of the main flow passage 92 to permit the flow of exhaust gases from the reaction chamber. Outlet 100 connects with one end of the exhaust heat passage 78 which, in turn, connects at its other end with opening 98, exhaust flow through opening 98 and the heat passage 78 joining to flow through an outlet passage 102, which serves as the outlet from the exhaust manifold and may be connected to a suitable vehicle exhaust system.

At the juncture of the reaction chamber outlet 98 and the exhaust heat passage 78, there is provided a damper valve 103 which is pivotally mounted so as to be movable from a position preventing flow through opening 98 and allowing free flow through the passage 78, as shown in the drawings, to an alternate position substantially blocking flow through the passage 78 and permitting free flow through the opening 98. Valve 103 is preferably temperature responsive and may be operated through a conventional manifold heat valve mechanism or other suitable arrangement so as to direct substantially all the exhaust flow from the reaction chamber 76 through the exhaust heat passage 78 when the engine is cold and to gradually open and move to the alternate position, blocking flow through the passage 78 and permitting exhaust flow directly from the reaction chamber to the main exhaust outlet 102 when the engine has reached normal operating temperature.

On its upper surface, exhaust manifold 32 is provided with a boss 104 having a vertical opening 106 therethrough which connects with the exhaust heat passage 78 and is aligned with assembly with the primary riser 60 of the inlet manifold. Between boss 104 of the exhaust manifold and boss 72 of the inlet manifold, there is secured the sheet metal heat stove bonnet 36 which acts in part as a plate or hot spot, separating the inlet manifold riser 60 from the exhaust heat passage 78. This hot spot portion is heated by exhaust gases passing through passage 78 so that liquid fuel falling on the plate from the interior of the primary inlet manifold passage is vaporized and passes into the engine. Bonnet 36 also extends outwardly and downwardly in spaced relation with and surrounding portions of the manifold walls defining the exhaust heat passage 78, so as to form a passage 110 for air flow between the manifold and the stove bonnet 36. An outlet opening 112 with a nozzle-like connection 114 is provided in the bonnet member 36 for connection with the engine induction system so that heated air may be drawn from the heat stove into the engine during engine warmup, the flow being controlled by conventional devices in known manner.

Exhaust heat is also provided to the choke mechanism 52 by providing a flow of air through a heat tube 118 which extends from the choke mechanism 52 down through openings in the manifold walls into the exhaust heat passage 78 and out to a connection, not shown, with the engine induction system from which clean air is obtained.

In assembly, carburetor 38 is mounted on the intake manifold 34, which is in turn secured to the exhaust manifold 32 by means, not shown, the heat stove bonnet 36 being clamped therebetween. This assembly is pivotally attached to the engine housing 12 by hinge elements 120 which extend from the lower portion of the exhaust manifold body and are retained to the engine housing 12 by pins 122. The assembly is retained against the mounting surfaces of the engine housing with the various rubber seal elements in compression by means of a mounting strap or bail 124 which is secured to the engine housing and extends around the exhaust manifold, as shown in the drawings.

In operation, upon starting the engine, choke 50 is closed and the damper valve 103 is positioned to substantially block exhaust flow through the outlet 98. Engine exhaust gases pass through reaction chamber 76 where, when a suitable temperature is reached, they are further reacted to remove undesirable combustibles. The gases then pass through the exhaust heat passage 78, providing heat to the hot spot, the choke heat tube 118, and the heat stove through the manifold walls. As the engine temperature increases, the choke control is heated by the exhaust heat and opens the choke. Also, heated air supplied to the engine induction system from the heat stove 36 is mixed with cooler air and is finally cut off by the conventional control mechanism on the induction system. Finally, the damper valve 103 moves toward its alternate position, first reducing and then substantiaoly cutting off exhaust gas flow through the bypass passage 78 so that exhaust gases pass directly out from the reaction chamber. This substantially reduces heat supplied to the hot spot of the intake manifold to a level suitable for running at normal operating temperatures.

While the invention has been described by reference to a preferred embodiment, it should be apparent that numerous changes could be made within the spirit and scope of the inventive concepts described. It would be possible, for example, to modify the arrangement disclosed for operation with a single-rotor engine or with an engine having more than two rotors. It is accordingly desired that the invention be given its full scope as permitted by the language of the following claims.

I claim:

1. A dual rotor internal combustion engine comprising a housing defining a pair of epitrochoidal cavities disposed in adjacent end-to-end relation, a rotor in each of said cavities and eccentrically rotatable therein, said rotors each defining a plurality of expansible working chambers which, upon rotation of said rotors, are passed through the cyclic events of a power-producing internal combustion engine cycle, said housing having a side wall including a primary inlet port connecting with both said cavities at their inner ends, a pair of secondary inlet ports, one connected with each of said cavities at their outer ends, and a pair of exhaust ports, one connected with each of said cavities, a two-stage inlet manifold mounted on said housing wall, said manifold having a primary flow passage connected with said housing primary inlet port and a secondary flow passage connected with said housing secondary inlet ports, and an exhaust reactor manifold mounted on said housing wall, said exhaust manifold including an insulated reaction chamber having a pair of inlet ports connected with said engine housing exhaust ports, baffle means in said reaction chamber and providing an extended flow path in said chamber from each of said inlet ports to a main flow passage, a first outlet opening from said main flow passage, a second outlet opening from said main flow passage and connected with a bypass passage in said exhaust manifold but outside said insulated chamber, said bypass passage extending adjacent said inlet manifold and continuing to a junction with said first outlet opening outside said chamber, and an exhaust outlet from said junction of the first outlet opening and said bypass passage, said exhaust reactor manifold being secured to said inlet manifold with a portion of said bypass passage being separated from said primary flow passage by a sheet metal member adapted to freely transmit heat from exhaust gases in said bypass passage to air-fuel mixture in said primary flow passage to aid in vaporizing the fuel, and a damper valve in said exhaust manifold at the junction of said first outlet opening and said bypass passage, said damper valve being positioned to control the relative amounts of exhaust gas flow through said first outlet opening and said bypass passage, said valve being responsive to temperature to direct exhaust gas flow primarily through said bypass passage during the engine starting and warmup period and to direct exhaust gas flow primarily through said first outlet opening when the engine is at normal operating temperature.

2. The engine of claim 1 and further comprising a two-stage carburetor mounted on said inlet manifold and adapted to deliver air-fuel mixture thereto, said carburetor having a primary bore connected with the primary flow passage of said inlet manifold and a secondary bore connected with the secondary flow passage of said inlet manifold, a temperature responsive choke in said primary bore, a heat tube extending from said choke through said sheet metal member and into said exhaust manifold bypass passage to provide air heated by the exhaust gases to said choke, said sheet metal member forming the bonnet of a heat stove and extending beyond the secured portions of said inlet and exhaust manifolds and around a substantial portion of the bypass passage of said exhaust manifold, said bonnet having a discharge opening and spaced from the outer surface of said exhaust manifold to form an air flow path in heat exchange relation with said exhaust manifold from which heated air may be drawn through said discharge opening to the engine air inlet.

3. A manifold assembly for a dual rotor internal combustion engine, said assembly comprising an exhaust reactor manifold having a pair of inlet openings and a main outlet opening, means defining an insulated reaction chamber within said manifold, said inlet openings connecting with said reaction chamber, baffle means in said reaction chamber and defining therein a main flow passage and separate extended flow paths from each of said inlet openings to said main flow passage, said reaction chamber defining means having first and second outlet openings at opposite ends of said main flow path, means defining an exhaust heat passage in said manifold and forming a portion of the exterior thereof, said exhaust heat passage extending along the outside of said reaction chamber and connecting said first and second outlet openings, said main outlet opening being connected with said first outlet opening and said exhaust heat passage, and a damper valve in said exhaust manifold at the juncture of said bypass passage and said first outlet opening, said damper valve being alternately movable to block exhaust gas flow through said first outlet opening or said exhaust heat passage or to regulate the relative amounts of exhaust gas flow therethrough so as to provide varying degrees of exhaust heat to said exhaust heat passage, a two-stage inlet manifold having separate primary and secondary air-fuel mixture flow passages, including riser portions extending generally vertically and opening upwardly through a carburetor mounting boss and runner portions extending horizontally and opening at spaced outlet ports, said inlet manifold and said exhaust manifold being secured together at mating bosses formed respectively below the primary riser portion of said inlet manifold and on the exhaust heat passage defining means of said exhaust manifold, said primary riser and said exhaust heat passage including aligned portions extending through their respective bosses, and a thin heat-conducting plate secured between said mating bosses and separating said primary riser from said exhaust heat passage, said plate forming a hot spot for vaporizing fuel collected thereon with heat conducted from the exhaust gases.

4. The manifold assembly of claim 3 wherein said plate forms a portion of a sheet metal bonnet enclosing a portion of exhaust heat passage-defining means of said exhaust manifold, said bonnet being spaced from said passage-defining means to form an air flow path in heat exchange relation with the exhaust heat passage and having an air inlet around the edge of said bonnet, and an outlet opening in said bonnet for connection with an engine air intake to provide heated air thereto.

* * * * *